United States Patent Office 2,769,801
Patented Nov. 6, 1956

2,769,801

DYEABLE COPOLYMERS OF ACRYLONITRILE AND AMINOESTERS OF ITACONIC ACID

George E. Ham, Decatur, Ala., assignor to The Chemstrand Corporation, Decatur, Ala., a corporation of Delaware No Drawing. Application March 16, 1953,
Serial No. 342,720

7 Claims. (Cl. 260—78.5)

This invention relates to new copolymers of acrylonitrile. More specifically, it is related to the polymerization products of polymerizable masses comprising acrylonitrile and certain esters of itaconic acid polymerized in the presence or absence of other monoethylenic copolymerizable compounds. This invention also deals with compositions of these copolymers adapted to the formation of shaped articles, in many cases to molecularly oriented shaped articles, particularly to fibers, threads, bristles, monofilaments, etc., hereinafter referred to as fibers, and other shaped articles such as films and the like, which articles show improved dyeing properties. In addition, this invention relates to the new esters of itaconic acids which serve as monomers in the preparation of the polymers of this invention.

Polyacrylonitrile and copolymers of acrylonitrile and other polymerizable olefinic monomers are well-known to the art. In general such compositions are valuable materials for the fabrication of synthetic fibers, but many are not universally useful because of the lack of dye affinity. This resistance of acrylonitrile polymers to dyes of all types has presented serious dyeing problems. In order to dye polyacrylonitrile one commercial process resorts to the use of high pressures with water solutions or dispersions of dyes. Copolymers of acrylonitrile and a vinylpyridine are known to the art to be useful, dyeable compositions, but they possess the disadvantage of thermal instability. A further disadvantage of the copolymers of acrylonitrile and vinylpyridines lies in the active nature of the vinylpyridine which may polymerize spontaneously during its preparation, storage or use. Copolymers of acrylonitrile and certain esters of itaconic acid have also been proposed to increase the receptivity of such fibers to basic and acetate dyes.

It has now been found that improvements in acid-dyeing properties of acrylonitrile polymers may be effected by a process of preparing acrylonitrile copolymers in which an aminoester of itaconic acid is used as a monomer in a polymerizable composition comprising monomeric acrylonitrile. The polymerizable composition may contain any number of other copolymerizable ethylenic compounds.

Itaconic esters used in the practice of the present invention have the formula:

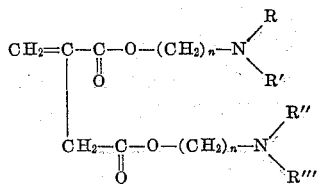

wherein R, R', R", and R''' each represents an alkyl radical having no more than four carbon atoms and $n$ represents a small whole number from two to four, inclusive. Illustrative examples of radicals represented by R, R', R", and R''' in the above formula are: methyl, ethyl, propyl, isopropyl and n-butyl. R, R', R", and R''' may represent the same or different radicals. These compounds are prepared by esterification of itaconic acid with an aminoalcohol having the formula:

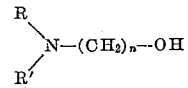

wherein R and R' each represents an alkyl radical having no more than four carbon atoms and $n$ represents a small whole number from two to four, inclusive. The ester can be prepared by refluxing the aminoalcohol with itaconic acid in the presence or absence of a polymerization inhibitor.

The useful copolymers of this invention are those containing from 80 percent to 99.5 percent of acrylonitrile and from 0.5 percent to 20 percent of the aminoester of itaconic acid. Preferred copolymers are those of as high as possible acrylonitrile content and yet having sufficient comonomer to be rendered dye-receptive.

In addition to the acrylonitrile and aminoester of itaconic acid, the copolymers may include small proportions of other monomers interpolymerized therewith, for example vinyl acetate, vinyl chloride, vinylidene chloride, styrene, methacrylonitrile, vinylpyridines, methyl methacrylate, and diethyl maleate. The quantity of the comonomer present in polymerized form in the acrylonitrile polymer must necessarily be small, since at least 80 percent acrylonitrile is required to produce fibers with desirable tensile properties, and since at least 0.5 percent of the aminoester of itaconic acid is required. Accordingly, copolymers of up to 19.5 percent of the comonomer, or mixtures of comonomers, are useful.

The new copolymers of acrylonitrile and the aminoesters of itaconic acid may be prepared by any polymerization procedure, but the preferred practice utilizes a modified aqueous polymerization, whereby finely divided solid polymers capable of use directly in fiber operations are obtained. The emulsion polymerization procedure may utilize batch methods, wherein the monomers are charged to a reaction vessel with an aqueous medium containing the necessary catalyst and dispering agents. However, the preferred procedure involves a semi-continuous procedure, in which a mixture of monomer is charged to an aqueous medium maintained under conditions necessary to effect polymerization. Obviously, entirely continuous procedures may also be used in which the monomers are gradually introduced to the reactor and the copolymers removed continuously.

The polymerization is catalyzed by means of any water-soluble peroxy compound, for example sodium peroxide, hydrogen peroxide, potassium persulfate, sodium percarbonate, sodium perborate, and the alkali metal and ammonium salts of the same, and other peroxy acids, and any other water soluble compound containing a peroxy group (—O—O—). A wide variation in the quantity of peroxy compound is possible. For example, from 0.1 to 3.0 percent by weight of the polymerizable monomer may be used. The catalyst may be charged at the outset of the reaction, or it may be added continuously, or in increments, throughout the reaction for the purpose of maintaining a more uniform concentration of catalyst in the reaction mass. The latter method is preferred because it tends to make the resultant polymer more uniform in its chemical and physical properties.

Although the uniform distribution of the reactants throughout the reaction mass can be achieved by vigorous agitation, it is generally desirable to promote the uniform distribution of reagents by using wetting agents, or emulsion stabilizers. Suitable reagents for this purpose are the water-soluble salts of fatty acids, such as sodium oleate and potassium stearate, mixtures of water-soluble fatty acid salts, such as common soaps prepared by the saponification of animal and vegetable oils, the "amine soaps," such as salts of triethanolamine and dodecylmethylamine, salts of rosin acids and mixtures thereof, the water-soluble salts of half esters of sulfuric acid and long chain aliphatic alcohols, sulfonated hydrocarbons, such as alkylaryl sulfonates, and any other of the wide variety of wetting agents, which are in general organic compounds containing both hydrophobic and hydrophilic radicals. The quantity of emulsifying agent will depend upon the particular agent selected, the ratio of monomer to water being used, and the conditions of polymerization. In general, however, from 0.01 to one percent by weight of the monomers may be employed.

The preferred methods of operation are those which produce a copolymer of very uniform chemical and physical properties. Other characteristics of the copolymer are frequently of great importance, for example the particle size of the dispersion which is primarily concerned with the ease of filtration, the water to monomer ratio which must necessarily be low for the most economical production, and the yield and conversion of the monomers to copolymer.

The emulsion polymerizations are preferably conducted in glass or glass-lined vessels which are provided with a means for agitating the contents. Generally rotary stirring devices are the most effective means of insuring the intimate contact of the reagents, but other means may be successfully employed, for example by rocking or tumbling the reactors. The polymerization equipment generally used is conventional in the art, and the adaptation of a particular type of apparatus to the reaction contemplated is within the province of one skilled in the art.

The optimum polymerization conditions involve the use of polymerization regulators to prevent the formation of polymer increments of excessive molecular weight. Suitable regulators are the alkyl and aryl mercaptans, carbon tetrachloride, chloroform, diethiogylcidol and alcohols. The regulators may be used in amounts varying from 0.001 to two percent on the weight of the monomer to be polymerized.

When the polymerization is complete the polymer is separated from the aqueous medium by any of the conventionally used methods. When the optimum procedures above described are used, the polymer may be separated from the aqueous phase by filtration. The resulting polymer in either case may require washing operations to remove traces of soluble catalyst or dispersing agent.

Useful fibers may be made from the copolymers of this invention by conventional methods. The preferred practice involves the preparation of spinning solutions by dispersing the copolymer in suitable solvents, for example N,N-dimethylacetamide, N,N-dimethylformamide, gamma-butyrolactone and ethylene carbonate. The polymer solutions are fabricated into fibers by extrusion through a suitable die or a spinneret containing a plurality of minute apertures into a medium which removes the solvent and causes the polymer to precipitate into a continuous linear form. The said medium may be liquid, for example water, or aqueous solutions of acids, bases or salts, or it may be a gaseous medium, for example air or any gas which is inert with respect to the polymer.

This invention is further illustrated by the following specific examples:

*Example I*

In a one-liter, three-necked flask equipped with mechanical stirrer, thermometer, Dean-Stark trap and reflux condenser, was placed 65 g. (0.5 mole) of itaconic acid, 178 g. (2 moles) of dimethylaminoethanol and 200 ml. of benzene. One gram of pyrogallol was also added as an inhibitor. Some heat was evolved on mixing the reagents, and the flask was then warmed to reflux and held there for five days while removing 17 mls. of water. Benzene and excess dimethylaminoethanol were then stripped off, and 115 g. of bis-(dimethylaminoethyl) itaconate was recovered giving a yield of 84.8%.

*Example II*

A mixture of 20 g. of acrylonitrile, 5 g. of bis-(dimethylaminoethyl) itaconate, 100 g. of distilled water, .025 g. of the sodium salt of a formaldehyde-napthalenesulfonic acid condensation product, and 0.25 g. of azo-2,2'-diisobutyronitrile was heated for 16 hours at 70° C. in a sealed glass reaction vessel rotated to provide agitation of the mixture. The polymer slurry was then filtered, washed with alcohol and water, and dried, yielding 18.6 g. of a copolymer containing 80 percent acrylonitrile and 20 percent of bis-(dimethylaminoethyl) itaconate. A 15 percent solution of the copolymer in N,N-dimethylacetamide was spun into a solution containing 60 percent of N,N-dimethylacetamide and 40 percent of water. One gram of the fiber thus prepared was dyed with a mixture of 1 cc. of 2 percent Wool Fast Scarlet, 5 cc. of three percent $H_2SO_4$ and 40 cc. of distilled water for one hour at 100° C. A bright scarlet color was produced on the fiber.

*Example III*

The procedure of Example II was used to prepare copolymers of acrylonitrile and each of the following: bis-(dibutylaminobutyl) itaconate, bis-(dipropylaminoethyl) itaconate, bis-(methylethylaminoethyl) itaconate, bis-(diethylaminopropyl) itaconate.

I claim:

1. A copolymer of from 80 percent to 99.5 percent by weight of acrylonitrile and from 0.5 percent to 20 percent by weight of a compound having the formula:

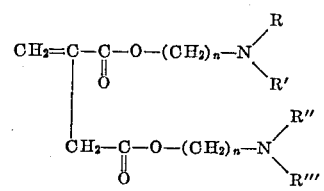

wherein R, R', R'', and R''' each represents a radical of the group consisting of alkyl radicals having no more than four carbon atoms, and $n$ represents a whole number from two to four inclusive.

2. A copolymer of from 80 percent to 99.5 percent by weight of acrylonitrile and from 0.5 percent to 20 percent of bis-(dimethylaminoethyl) itaconate.

3. A copolymer of from 80 percent to 99.5 percent by weight of acrylonitrile and from 0.5 percent to 20 percent of bis-(dibutylaminobutyl) itaconate.

4. A copolymer of from 80 percent to 99.5 percent by weight of acrylonitrile and from 0.5 percent to 20 percent of bis-(dipropylaminoethyl) itaconate.

5. A copolymer of from 80 percent to 99.5 percent by weight of acrylonitrile and from 0.5 percent to 20 percent of bis-(methylethylaminoethyl) itaconate.

6. A copolymer of from 80 percent to 99.5 percent by weight of acrylonitrile and from 0.5 percent to 20 percent of bis-(diethylaminopropyl) itaconate.

7. A shaped article comprising a copolymer of claim 1 dyed with an acid dye.

References Cited in the file of this patent

UNITED STATES PATENTS

| | | |
|---|---|---|
| 2,246,264 | Pinkernelle | June 17, 1941 |
| 2,279,883 | D'Alelio | Apr. 14, 1942 |
| 2,366,495 | D'Alelio | Jan. 2, 1945 |
| 2,494,875 | Hirt | Jan. 17, 1950 |
| 2,531,408 | D'Alelio | Nov. 28, 1950 |
| 2,531,410 | D'Alelio | Nov. 28, 1950 |

FOREIGN PATENTS

| | | |
|---|---|---|
| 864,151 | Germany | Jan. 22, 1953 |